United States Patent
Mason

Patent Number: 5,127,120
Date of Patent: Jul. 7, 1992

[54] INFANT SUPPORT PAD

[76] Inventor: Cynthia A. Mason, 22 N. Granada Ave., Unit E, Alhambra, Calif. 91801

[21] Appl. No.: 739,300

[22] Filed: Aug. 1, 1991

[51] Int. Cl.[5] .................... A47D 15/00; A47D 1/00; A47C 24/14

[52] U.S. Cl. ........................ 5/655; 5/637; 5/603; 297/229; 297/464

[58] Field of Search .............. 5/431, 481, 448, 436, 5/434, 462, 424; 297/229, 397, 464; D6/601, 596, 605; 269/328

[56] References Cited

U.S. PATENT DOCUMENTS

| | | | |
|---|---|---|---|
| D. 309,068 | 7/1990 | Jordan et al. | D6/601 |
| 2,751,268 | 6/1956 | Creelman | 269/328 |
| 2,926,054 | 2/1960 | Rodin | 269/328 |
| 4,436,341 | 3/1984 | Converse | 297/464 |
| 4,613,188 | 9/1986 | Tsuge et al. | 297/464 |
| 4,631,766 | 12/1986 | Semmler et al. | 5/431 |
| 4,779,930 | 10/1988 | Rosen | 297/464 |
| 4,825,487 | 5/1989 | Eberl | 5/431 |

*Primary Examiner*—Alexander Grosz

[57] ABSTRACT

An infant support pad composed, for example, of a plastic foam and including a first embodiment for use with infant retaining devices such as automobile safety seats, strollers, high-chairs, swings, and the like; and which includes a second reclining embodiment for use in hospitals and in cribs for small infants. The support pad of the invention serves to keep the neck, head and entire body of the infant from involuntary movement, and it cradles the infant from head to bottom. The infant support pad is constructed in a manner such that the infant fits directly into the pad, and the pad is shaped to extend over the sides of the head of the infant and engage the head as an ear-muff, and to prevent the head, neck and entire body of the infant from moving side to side.

3 Claims, 2 Drawing Sheets

INFANT SUPPORT PAD

BACKGROUND OF THE INVENTION

Infant support pads are generally known to the art. U.S. Pat. 4,631,766, for example, discloses an infant seat which is formed of a free standing pad adapted to support the infant in a generally supine position. The pad described in the patent presents a number of undulations which rise upwardly and downwardly relative to a horizontal reference plane passing through the pad. The pad described in the patent includes a downwardly-cupped, head-receiving cavity adjacent to a torso-engaging means. An upwardly raised, neck supporting cusp is located between the torso-engaging means and the head-receiving cavity, with the cavity, cusp and torso-engaging means preferably disposed along the central axis of the pad. The head-receiving cavity is arranged in a semi-spherical configuration for engaging the infants head over a concave area, the head-receiving cavity being designed to position the infants head in midline with the torso.

U.S. Pat. No. 4,779,930 discloses an infant head support for use with appropriate retaining devices. The head support of the '930 patent is formed of resilient foam, and it is configured to fit between the opposite side walls of an appropriate retaining device, with the head support being looped over the head of the infant and serving to wedge the head between the side walls of the retaining device.

The support pad of the present invention constitutes a distinct improvement over the prior art pads, including those discussed above. A prime objective of the present invention is to provide a infant support pad which is so constructed that the head of the infant is positioned directly in a cavity which is configured in a manner to be described so as to restrain the infant's head and neck from involuntary movement. The pad of the invention, in one of its embodiments, is configured to fit the infant's back down through the entirety of the torso holding the spine of the infant in line with the head and neck.

The pad of the invention, in one of the embodiments to be described, is provided with a slot for receiving the shoulder belt of an infant's safety seat. The pad in other embodiments may be constructed to have external dimensions appropriate to fit into standard strollers, high-chairs, and the like, to provide the infant with the desired improved support of the invention when so used.

The embodiment described briefly above is intended to support the infant in a generally upright position. A second embodiment to be described is a reclining version of the pad which is intended to be used in hospitals and clinics in conjunction, for example, with incubator and pediatric cribs in the neonatal, pediatrics and maternity areas.

SUMMARY OF THE INVENTION

DETAILED DESCRIPTION OF THE ILLUSTRATED EMBODIMENTS

The infant support pad of the invention is preferably formed of a polyuerathane foam which is molded to a desired shape. The foam density is not critical, and 1.4–1.8 pounds/cubic foot have been found acceptable.

It is desirable that the foam body be covered with an appropriate fabric attached to the body, for example, by VELCRO or other appropriate fasteners.

Figure 1:
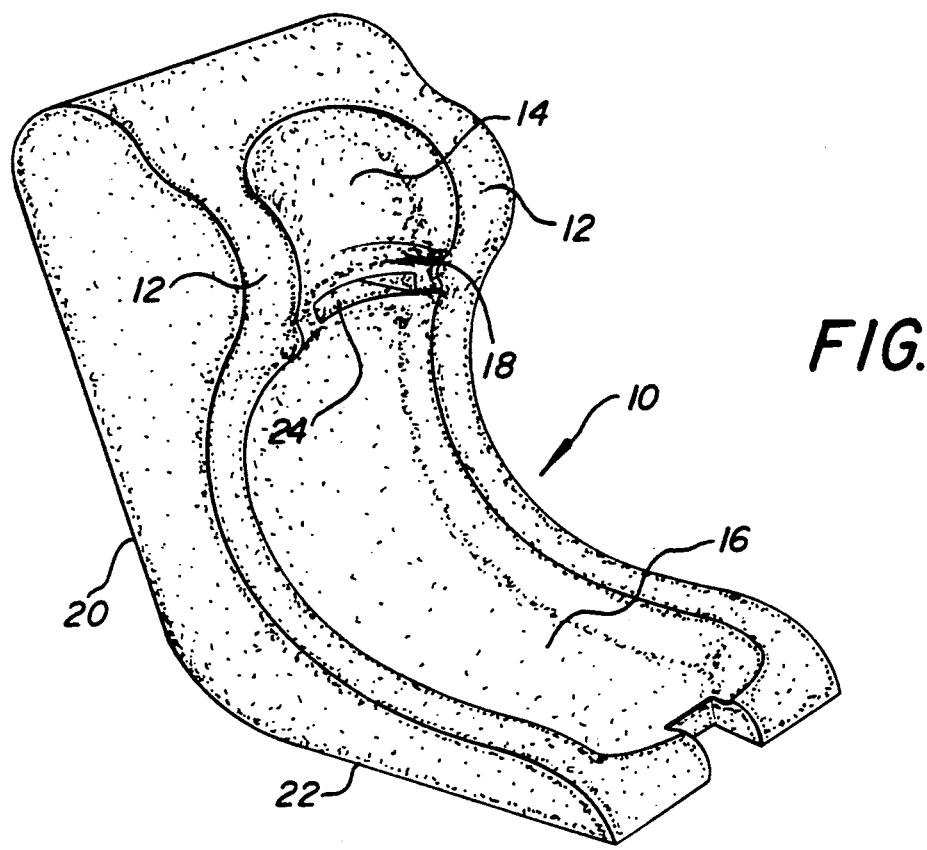
FIG. 1 is a perspective view of an infant support pad representing one embodiment of the invention, which supports the infant in an upright position taken from the front and to one side of the pad.
Figure 2:
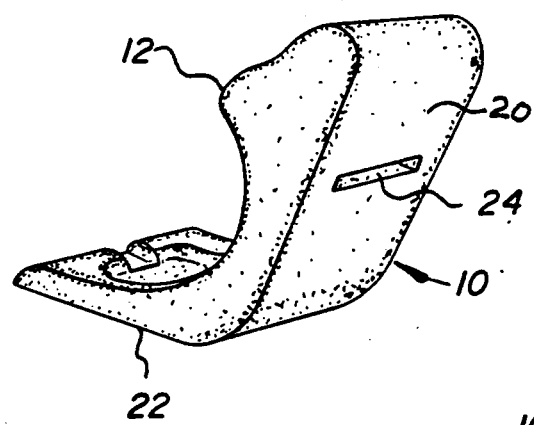
FIG. 2, is a perspective view of the pad of FIG. 1, on a somewhat reduced scale, taken from the back and to one side of the pad.
Figure 3:
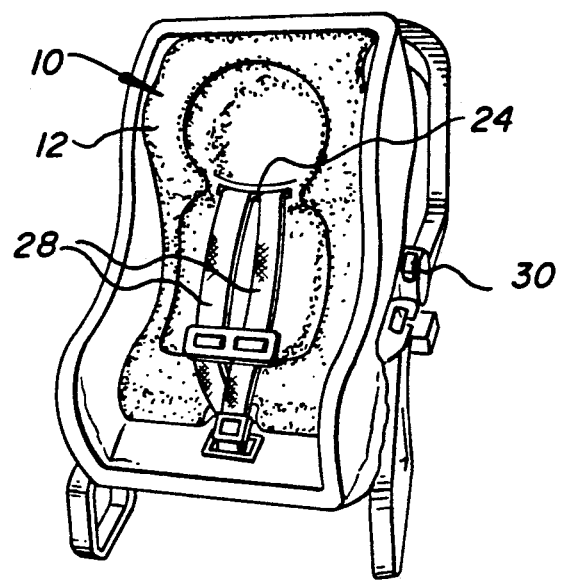
FIG. 3, is a perspective view of a the pad of FIG. 1 supported in a standard infant safety seat.

The infant support pad illustrated in FIGS. 1-3 is designated generally as 10. As shown, the pad has an undulation 12 at one end which extends outwardly from a reference plane located within the pad and along a central axis extending, for example, longitudinally of the pad.

A cup-shaped head-receiving cavity 14 is located at the aforementioned end of the pad and the cavity 14 extends inwardly from the undulation 12 toward the reference plane. In this manner, the undulation 12 forms ear-muffs on either side of cavity. These ear muffs firmly support the head of the infant from involuntary movement.

The pad 10 also includes a body-receiving cavity 16 located at the other end of the pad along the central axis, and the body-receiving cavity 16 extends inwardly from the reference plane. An outwardly raised neck-supporting cusp 18 is located along the central axis between the head-receiving cavity 14 and the body-receiving cavity 16, as best shown in FIG. 1.

The rear surface 20 of pad 10, as best shown in FIG. 2 has a generally planar configuration, as does the bottom surface 22, with the rear surface 20 and bottom surface 22 extending substantially at right angles to one another.

A seat belt slot 24 extends through the rear surface 20 (FIG. 2) and through the cusp 18. This slot serves to receive shoulder straps 28 (FIG. 3), when the pad is supported in a safety seat 30.

Figure 4:
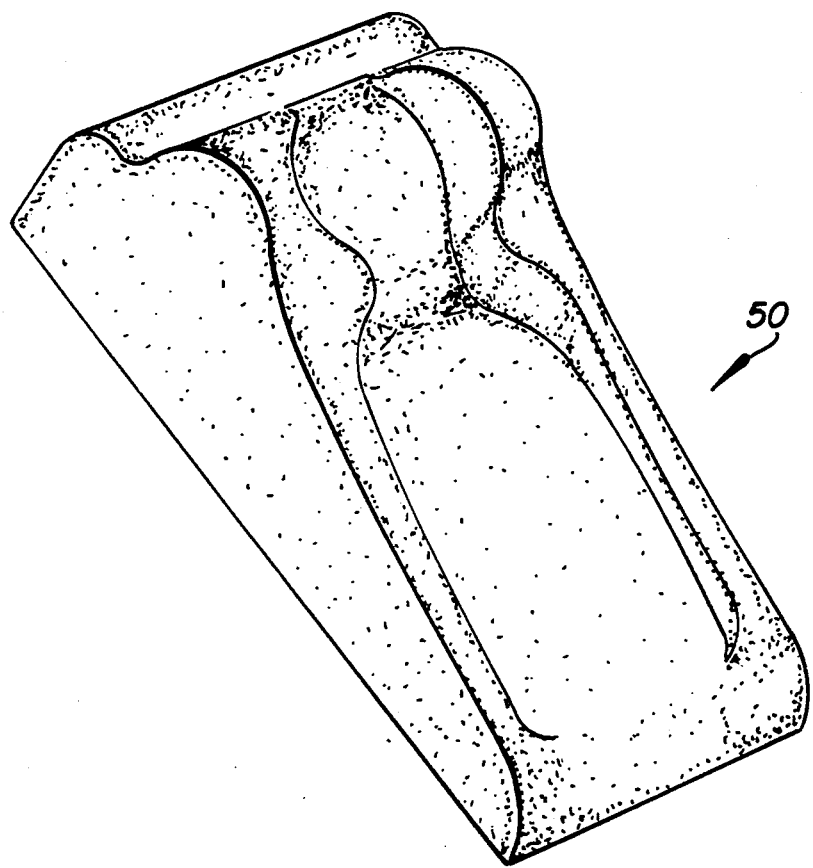
FIG. 4, is a perspective view of a second embodiment which supports the infant in a reclining position.

The embodiment of FIG. 4 is indicated generally as 50. It is generally similar to the embodiment of FIGS. 1-3, except that the embodiment of FIGS. 1-3 is intended to support the infant in an upright position, whereas the embodiment of FIG. 4 is intended to support the infant in a reclining position.

As stated above, the embodiment of FIGS. 1-3 is intended to be used in conjunction with an infant's safety seat, or in strollers, high-chairs, and the like. The reclining version of FIG. 4, on the other hand, is intended for hospital use, in incubators, pediatric cribs, and the like.

It will be appreciated that while particular embodiments of the invention have been shown and described, modifications may be made, and it is intended in the claims to cover all such embodiments which fall within the true spirit and scope of the invention.

I claim:

1. An infant support pad having a central axis and a reference plane passing through the pad, and having an undulation at one end thereof extending outwardly from said reference plane, said pad including: a cup-shaped head-receiving cavity located at one end of said pad along said central axis and extending inwardly from said undulation toward said reference plane with said undulation forming ear-muffs on either side of said cavity for firmly supporting the head of an infant from involuntary movement the pad further including a body-receiving cavity located at the other end of said pad along said central axis and extending inwardly from said referenced plane, and a neck support cusp located along said axis between said head-receiving cavity and said body-receiving cavity, said cusp having a slot therein for receiving a shoulder belt when the pad is used in conjuction with a safety seat, said body having a generally planar rear surface and a generally planar bottom surface at approximately right angles to one another, and generally planar side surfaces parallel to one another and dimensioned to be received in a safety seat, stroller, high chair, and the like.

2. The infant support pad defined in claim 1 and which is composed of a plastic foam.

3. The infant support pad defined in claim 1, and which is constructed to support an infant in an upright position.

* * * * *